(12) United States Patent
Otranen et al.

(10) Patent No.: US 8,850,554 B2
(45) Date of Patent: Sep. 30, 2014

(54) METHOD AND APPARATUS FOR PROVIDING AN AUTHENTICATION CONTEXT-BASED SESSION

(75) Inventors: Jari Otranen, Espoo (FI); Lauri Tarkkala, Espoo (FI); Deepali Khushraj, Arlington, MA (US)

(73) Assignee: Nokia Corporation, Espoo (FI)

( * ) Notice: Subject to any disclaimer, the term of this patent is extended or adjusted under 35 U.S.C. 154(b) by 700 days.

(21) Appl. No.: 12/707,097

(22) Filed: Feb. 17, 2010

(65) Prior Publication Data

US 2011/0202988 A1  Aug. 18, 2011

(51) Int. Cl.
G06F 21/31  (2013.01)

(52) U.S. Cl.
USPC ..................... 726/12; 726/4; 726/8

(58) Field of Classification Search
USPC .................................. 726/8, 10, 12
See application file for complete search history.

(56) References Cited

U.S. PATENT DOCUMENTS

| | | | |
|---|---|---|---|
| 8,327,426 B2 * | 12/2012 | Kinser et al. | 726/8 |
| 2003/0188193 A1 * | 10/2003 | Venkataramappa | 713/201 |
| 2006/0005237 A1 * | 1/2006 | Kobata et al. | 726/12 |
| 2007/0283421 A1 | 12/2007 | Hirose | |
| 2008/0127321 A1 * | 5/2008 | Vaeth | 726/9 |
| 2008/0244719 A1 | 10/2008 | Hariya et al. | |
| 2008/0263629 A1 | 10/2008 | Anderson | |
| 2008/0271129 A1 | 10/2008 | Mukkara | |
| 2009/0217366 A1 * | 8/2009 | Gao et al. | 726/8 |
| 2009/0328178 A1 * | 12/2009 | McDaniel et al. | 726/9 |
| 2010/0043065 A1 * | 2/2010 | Bray et al. | 726/8 |
| 2010/0077469 A1 * | 3/2010 | Furman et al. | 726/8 |
| 2010/0106971 A1 | 4/2010 | Premec | |
| 2010/0281530 A1 * | 11/2010 | Tarkoma | 726/9 |

FOREIGN PATENT DOCUMENTS

| | | |
|---|---|---|
| CN | 1805335 A | 7/2006 |
| CN | 101677329 A | 3/2010 |
| JP | 2007-310512 A | 11/2007 |
| WO | WO 2009/074709 A1 | 6/2009 |
| WO | WO 2009/140953 A1 | 11/2009 |

OTHER PUBLICATIONS

International Search Report for corresponding PCT Application No. PCT/FI2011/050066, May 26, 2011, pp. 1-6.
Written Opinion of the International Searching Authority for corresponding PCT Application No. PCT/FI2011/050066, May 26, 2011, pp. 1-8.
Chinese Office Action for related application no. 201180009803.8 with English language summary, issued May 5, 2014, 9 pages.

\* cited by examiner

*Primary Examiner* — Jung Kim
*Assistant Examiner* — Carlos M De Jesus Lassaia
(74) *Attorney, Agent, or Firm* — Ditthavong & Steiner, P.C.

(57) ABSTRACT

An approach is provided for providing separation of authentication protocols and/or authentication contexts for client-server and server-server communication in network communication. A proxy server receives a request to initiate a service session. The request includes a first authentication context. The proxy server request verification of the first authentication context from an authentication server and validates the first authentication context based, at least in part, on the verification. The proxy server implements a second authentication context based, at least in part, on the verification of the first authentication context to initiate the service session.

17 Claims, 8 Drawing Sheets

METHOD AND APPARATUS FOR PROVIDING AN AUTHENTICATION CONTEXT-BASED SESSION

BACKGROUND

Network service providers and device manufacturers are continually challenged to deliver value, convenience, and security to consumers by, for example, providing compelling network services. Services can be provided by the service providers using, for example, application servers. Convenience and security of access to these servers are important challenges that service providers face everyday. Authentication servers can be used to provide security for client applications to access application servers. Traditionally, the authentication solutions that are defined for server to server integration generally also dictate the model that is used for client to server authentication. In many cases, this dependency of the client to server authentication models on the server to server authentication model can result in potentially high traffic loads on participating application servers and authentication servers. Also, this dependency puts at risk the overall security of the system when client applications are not secured.

SOME EXAMPLE EMBODIMENTS

Therefore, there is a need for an approach for providing separation of authentication protocols and/or authentication contexts for client to server communication and server to server communication to overcome the above mentioned limitations.

According to one embodiment, a method comprises receiving a request to initiate a service session. The request includes a first authentication context. The method also comprises requesting verification of the first authentication context from an authentication server. The method further comprises validating the first authentication context based, at least in part, on the verification. The method further comprises implementing a second authentication context based, at least in part, on the verification of the first authentication context to initiate the service session.

According to another embodiment, an apparatus comprising at least one processor, and at least one memory including computer program code, the at least one memory and the computer program code configured to, with the at least one processor, cause, at least in part, the apparatus to receive a request to initiate a service session. The request includes a first authentication context. The apparatus is also caused to request verification of the first authentication context from an authentication server. The apparatus is further caused to validate the first authentication context based, at least in part, on the verification. The apparatus is further caused to implement a second authentication context based, at least in part, on the verification of the first authentication context to initiate the service session.

According to another embodiment, a computer-readable storage medium carrying one or more sequences of one or more instructions which, when executed by one or more processors, cause, at least in part, an apparatus to receive a request to initiate a service session. The request includes a first authentication context. The apparatus is also caused to request verification of the first authentication context from an authentication server. The apparatus is further caused to validate the first authentication context based, at least in part, on the verification. The apparatus is further caused to implement a second authentication context based, at least in part, on the verification of the first authentication context to initiate the service session.

According to another embodiment, an apparatus comprises means for receiving a request to initiate a service session. The request includes a first authentication context. The apparatus also comprises means for requesting verification of the first authentication context from an authentication server. The apparatus further comprises means for validating the first authentication context based, at least in part, on the verification. The apparatus further comprises means for implementing a second authentication context based, at least in part, on the verification of the first authentication context to initiate the service session.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing separation of client to server (client-server) authentication and server to server (server-server) authentication are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
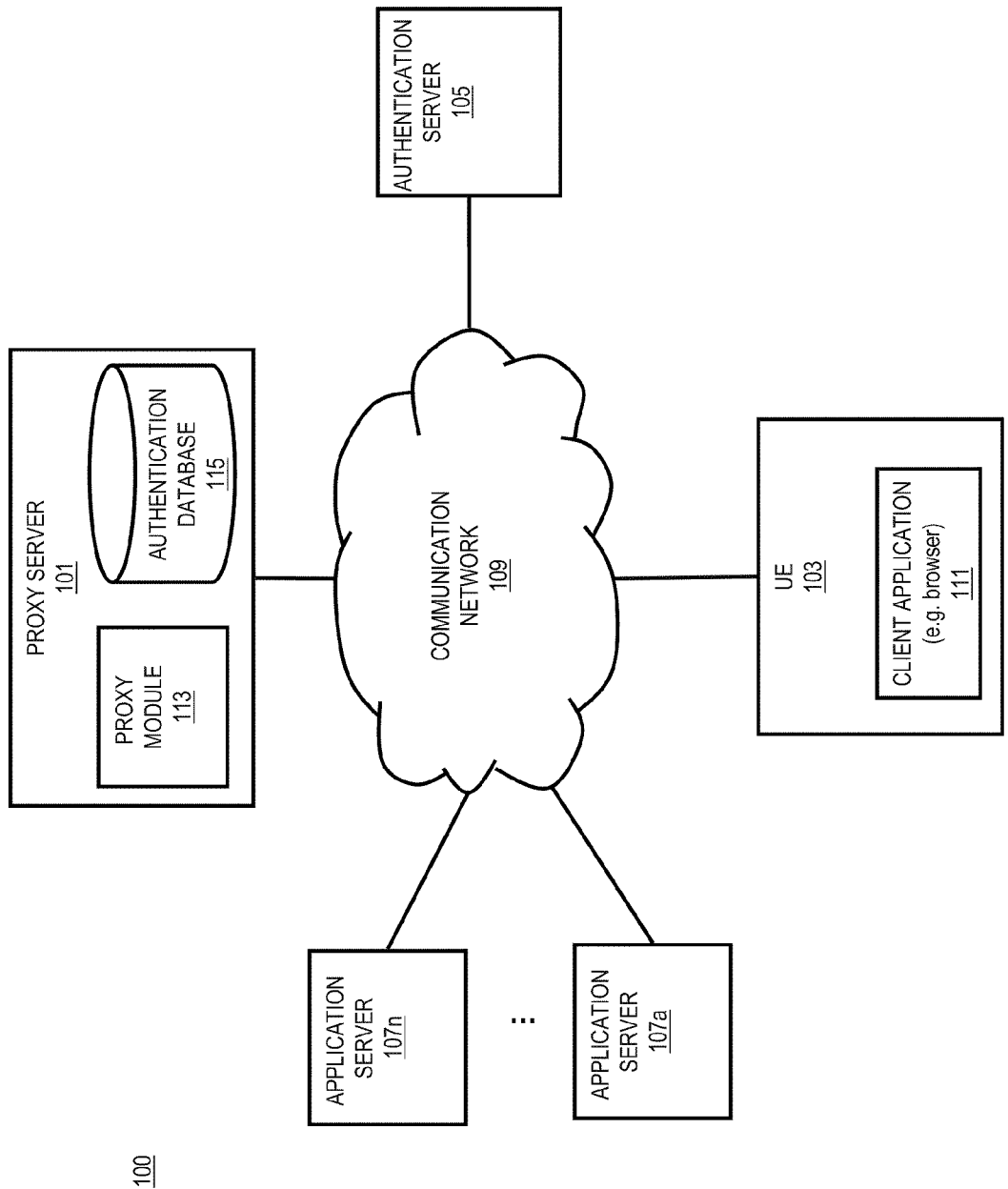
FIG. 1 is a diagram of a system capable of providing separation of client-server authentication and server-server authentication, according to one embodiment.

FIG. 1 is a diagram of a system capable of providing separation of client-server authentication and server-server authentication, according to one embodiment. Application servers (such as, but not limited to, web applications) can be used, for example, to provide services to users, clients, customers, etc. For example, a client application, provided on a user device, can communicate with an application server to retrieve data from the application server. Convenience and security of communication between client application and the application server are important challenges facing service providers. Traditionally, the client application can first authenticate itself against an authentication server and receive an authentication context from the authentication server. Next, the client application can use this authentication context to access the application server. The application server uses, for instance, the authentication server to verify and validate the authentication context received from the client application. The application server then responds to the client application request with the requested data if the authentication context is validated. Therefore, for each data retrieval request received at the application server, the application server accesses the authentication server to verify and validate the authentication context received with the data retrieval request, which results in potentially high traffic loads on participating application servers and authentication servers.

Further, after the client application and/or the user device authenticates itself against the authentication server and receives the authentication context, the same authentication scheme is generally used for communication between the client application and the application server and also for communication between the application server and the authentication server (for verification and validation). Therefore, the traditional authentication solutions that are defined for server to server integration generally also dictate the model that is used for client to server authentication. In many cases, this dependency of the client to server authentication models on the server to server authentication model can put at risk the overall security of the system when client applications are not secured (e.g., operating in a non-secure domain) and can preclude efficient load balancing of authentication-related traffic.

To address these problems, a system 100 of FIG. 1 can advantageously separate authentication protocol and/or authentication context that is used on different domains, such as client-server domain, server-server domain, etc. As used herein, the term 'authentication context' can include: (1) information regarding initial identification mechanisms of a user, client, customer, etc.; (2) information regarding authentication mechanism or method (e.g., passwords, one time password, a limited use key, a secret key, a consumer key, an access token, etc.); (3) information regarding storage and protection of credential (e.g., password rules, smart carts, etc.); and the like. It is contemplated that other information regarding the authentication parties involved in the authentication parties, the authentication schemes, etc. can be considered in the authentication context.

In the embodiment of FIG. 1, the proxy server 101 can be implemented as a gatekeeper between user equipment 103 and an authentication server 105. Additionally or alternatively, the proxy server 101 can be implemented as a gatekeeper between the user equipment 103 and one or more application servers 107a-107n. In this embodiment, the proxy server 101 can determine what authentication protocol and/or authentication context can be used for different domains. For example, the proxy server 101 can determine and implement a first authentication protocol for server-server communication (such as communication between proxy server 101 and the authentication server 105, communication between the proxy server 101 and one or more of the application servers 107a-107n, etc.). Further, the proxy server 101 can determine and implement a second authentication protocol for client-server communication (such as communication between user equipment 103 and/or client application 111 (e.g., a browser) and the proxy server 101). In one embodiment, the first and second authentication protocols can be the same. However, the proxy server 101 is configured to use different authentication protocols for the first and second protocols, and therefore, advantageously separates client-server and server-server authentication contexts. In one embodiment, the separation of the protocols can advantageously decrease load on the application servers 107a-107n and/or the authentication server 105. Also, according to certain embodiments, the proxy server 101 can control traffic that is transmitted to the application servers 107a-107n. The proxy server 101 can include a proxy module 113 and an authentication database 115 for performing various functions described below. Proxy module 113 and authentication database 115 are explained in more detail in FIG. 2.

In an embodiment, a user equipment (UE) 103, which desires to connect to, for example, the application server 107a of the application servers 107a-107n, first authenticates itself against the authentication server 105 through the communication network 109. In one embodiment, the UE 103 transmits its credentials to the authentication server 105 to be used for authentication purposes. In one example, the credentials of the UE 103 can include username and password. However, it is contemplated that any credentials can be used for authentication purposes, such as biometrics, one time password, network address filtering, etc. The authentication server 105 examines and validates the received credentials of the UE 103 and initiates an authentication context, if the credentials are validated. In one embodiment, the authentication server 105 can include a single sign-on authentication server and the authentication context can be shared between the UE 103 and the authentication server 105 using, for example, session cookies or tokens.

Single sign-on is an authentication process that enables a user (e.g., a user device, a client application, user of a user device, etc.) to authenticate once and gain access to resources of multiple software, applications, servers, etc., without being prompted to authenticate itself again at each of the resources.

Continuing with this embodiment, the UE 103 and/or client application 111 can initiate a connection with the proxy server 101. As mentioned before, the proxy server 101 can be implemented as a gatekeeper between the UE 103 and one or more of the application servers 107a-107n. In one example, the UE 103 transmits its authentication context information to the proxy server 101. In this example, the proxy server 101 can use the authentication context information received from the UE 103 (such as a cookie, token, etc.) to validate and verify the information. In one embodiment, the proxy server 101 can communicate with the authentication server 105 to verify the authentication context information received from the UE 103.

If the authentication context information is verified by the authentication server 105, the proxy server 101 can implement a desired authentication context with the UE 103 and/or client application 111. In one embodiment, the proxy server 101 determines the desired authentication context based on authentication context information received from the UE 103. Alternatively or additionally, the desired authentication context is determined based on the specific implementation of the proxy server 101. In other words, the authentication context between the UE 103 and the proxy server 101 can be determined independently and be different from the authentication context of the authentication server 105. Determination and implementation of a desired authentication context between the UE 103 and/or client application 111 and the proxy server 101 can advantageously separate the authentication protocol that is used between the UE 103 and the proxy server 101 (e.g., client-server domain) from an authentication protocol used in a server-server domain. More specifically, the separation of the client-server context from the server-server reduces the need for the server to authenticate every access by the client, thereby advantageously reducing the load on the authentication server 105.

Moreover, after the UE 103 and/or client application 111 have successfully initiated a desired authentication context with the proxy server 101, the UE 103 can transmit a request to retrieve data from, for example, an application server 107*a*, through the proxy server 101. In this embodiment, the proxy server 101 can receive the request for data retrieval. This request can be based on the desired authentication context (e.g., a client-server authentication context established between the UE 103 and the proxy server 101) and can include, for example, desired authentication context information, address of the desired application server 107*a*, etc. In one embodiment, the proxy server 101 can validate the desired authentication context information received from the UE 103 and, if the information is valid, can access the application server 107*a* using the first authentication context (e.g., a server-server authentication context implemented by the authentication server 105). In one example, the application server 107*a* responds to the user request, if the first authentication context is valid. Then, the response from the application server 107*a* is forwarded from the proxy server 101 to the UE 103 and/or client application 111.

According to an embodiment, the authentication server 105 can be a single sign-on server and the first authentication context used in server-server communication (such as communication between the proxy server 101 and the application server 107) can be based on a single sign-on authentication context. In this embodiment, the single sign-on authentication context can be based on OAuth. OAuth is a protocol that enables sharing of protected resources without sharing credentials. For example, tokens (such as a request token, access token, etc.) can be used in OAuth for the protected resources instead of the actual user credentials, thereby, for instance, reducing the potential for exposing the user credentials. In one embodiment, consumer keys and secrets are used in this protocol for identification purposes. In an embodiment that uses OAuth for the first authentication context for server-server communication, these keys or tokens can be kept in secret in the server premises. Additionally, according to certain embodiments, server-server communication can be encrypted, for example, using shared secret keys. Also, according to certain embodiments, the channel between the UE 103 and/or the client application 111 and the proxy server 101 can be a secure channel, such as Hypertext Transfer Protocol Secure (HTTPS), Secure Sockets Layer (SSL), etc.

By way of example, the communication network 109 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 103 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 103 can support any type of interface to the user (such as "wearable" circuitry, etc.).

By way of example, the proxy server 101, the UE 103, the authentication server 105, and the application servers 107*a*-107*n* communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

As discussed previously, in one embodiment, employing the proxy server 101 as a gatekeeper between the UE 103 and/or the client application 111 and the application servers 107*a*-107*n* can reduce the load of the application servers 107a-107n. For example, the proxy server 101 can implement an authentication context (such as the desired authentication context discussed above) with the UE 103 and/or the client application 111 and validates its information, therefore, not requiring the application servers 107a-107n to perform the validation with the authentication server 105. Moreover, in addition to separating authentication protocols and/or authentication contexts used for client-server and server-server, the proxy server 101 can advantageously control traffic initiated for the application servers 107a-107n.

It is noted that although FIG. 1 illustrates the proxy server 101, the authentication server 105, and the application servers 107a-107n as separate entities, it is contemplated that any combination of these servers can be implemented such that the functions of these components may be combined in one or more components or performed by other components of equivalent functionality.

Figure 2:
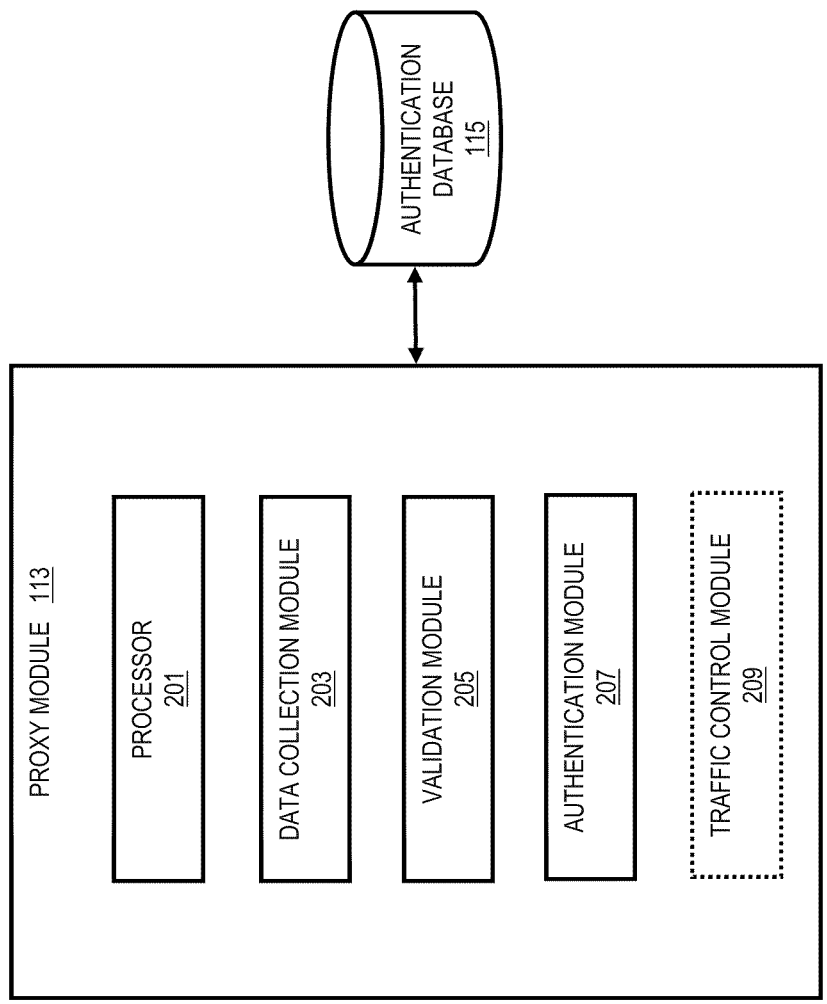
FIG. 2 is a diagram of the components of a proxy module, according to one embodiment.

FIG. 2 is a diagram of the components of a proxy module, according to one embodiment. By way of example, the proxy module 113 can include one or more components for providing separation of the authentication protocols and/or authentication contexts for client-server and server-server domains. It is contemplated that the functions of these components may be combined in one or more components or performed by other components of equivalent functionality. In this embodiment, the proxy module 113 can include at least a processor 201 or other control logic for executing at least one algorithm for performing the functions of the proxy module 113. For example, when the proxy module 113 is contacted by a client application of a user equipment (such as client application 111 of UE 103 of FIG. 1) for authentication, the processor 201 in communication with the data collection module 203 interacts with the client application to receive authentication information from the client application. In an embodiment, the authentication information can include a first authentication context. Alternatively or additionally, the first authentication context can include a token, a cookie, a key, or the like. It is further contemplated that the first authentication context can include other authentication information for ensuring that only authorized entities are able to access the application servers 107a-107n or other protected components of the network 103.

After receiving the authentication and/or service session initiation request from the client application, the processor 201 interacts with the validation module 205 to validate and/or verify the first authentication context received from the client application. In one embodiment, the validation module 205 can interact with an authentication server, such as authentication server 105, to verify the first authentication context received from the client application. In this embodiment, the validation module 205 can initiate a request for verification of the first authentication context to, for example, the authentication server 105, and can receive a verification response from the authentication server 105. In one example, the verification request sent by the validation module 205 can include a token or a cookie of the first authentication context that was originally generated and/or retrieved by the authentication server 105. Based on the verification response received from, for example, the authentication server 105, the validation module 205 can determine validity of the first authentication context.

If the validation module 205 determines that the first authentication context is valid, the authentication module 207, in interaction with processor 201, implements a second authentication context with the client application. By way of example, the authentication module 207 can be in communication with the authentication database 115 to implement the second authentication context. In one embodiment, the second authentication context is different from the first authentication context, therefore, different authentication schemes can be used for client-server and server-server communication. Alternatively, the first and second authentication contexts can be the same. According to an embodiment, the authentication module 207 can determine and implement a desired second authentication context based on different criteria, for example, the capabilities of a UE 103, the capabilities of the client application, network load, etc.

Further, as mentioned, the data collection module 203 can receive a request from a client application, such as client application 111 of FIG. 1, to retrieve data from, for example, an application server (e.g., one or more of application servers 107a-107n). Since the proxy module 113 has already verified the first authentication context of the client application, the data retrieval request from the client application is based on the second authentication context. The validation module 205 and/or the authentication module 207 validates the second authentication context and interacts with the data collection module 203 to forward the data retrieval request to the desired application server based on the first authentication context. The data collection module 203 can receive the request data from the application server based on the first authentication context and forward the retrieved data to the client application based on the second authentication context.

Also, the proxy module 113 can include an optional traffic control module 209. According to one embodiment, since requests from user equipment (e.g., UEs 103) and/or client applications pass through the proxy module 113, the traffic control module 209 can monitor data requests for the application servers (e.g., application servers 107a-107n) and, depending on request load, can take action (for example block, reroute, delay, etc.).

Figure 3:
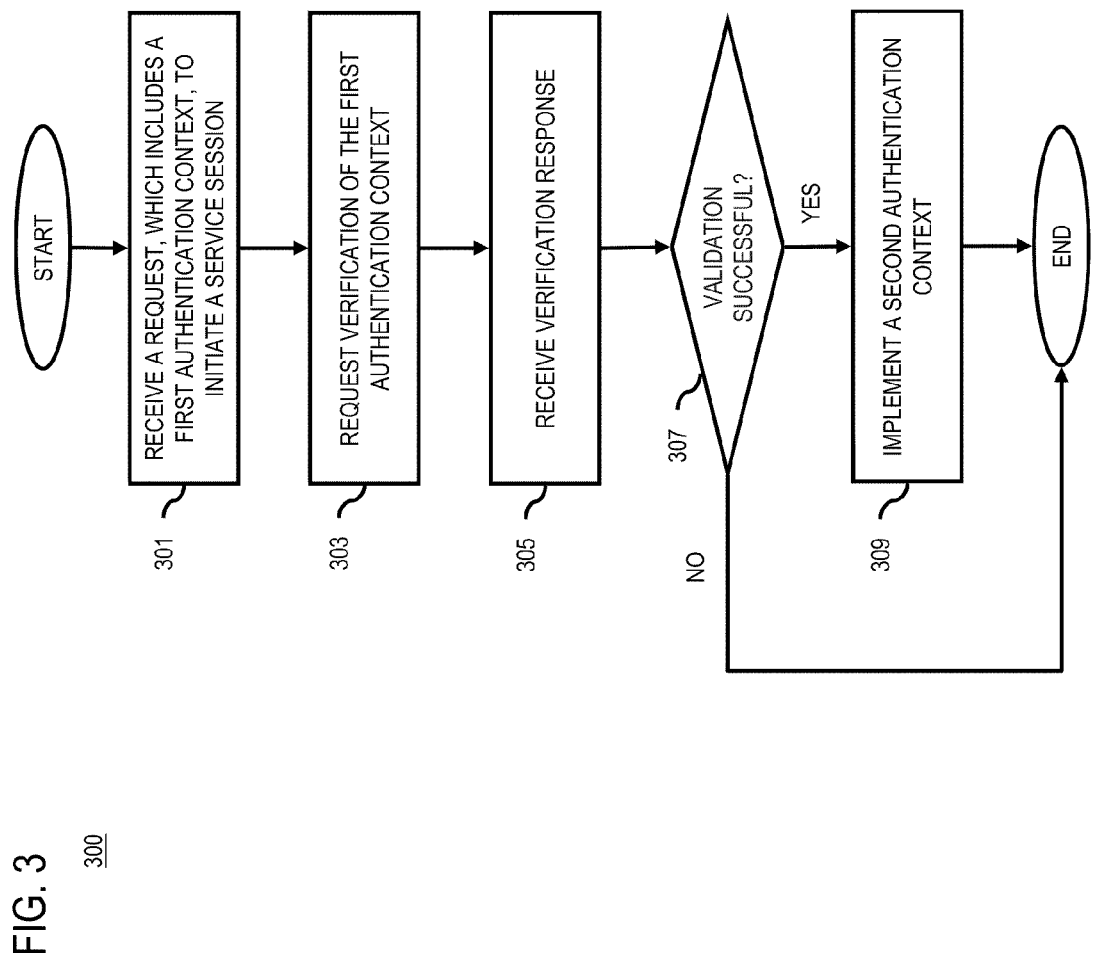
FIG. 3 is a flowchart of a process for implementing a second authentication context, according to one embodiment.
Figure 7:
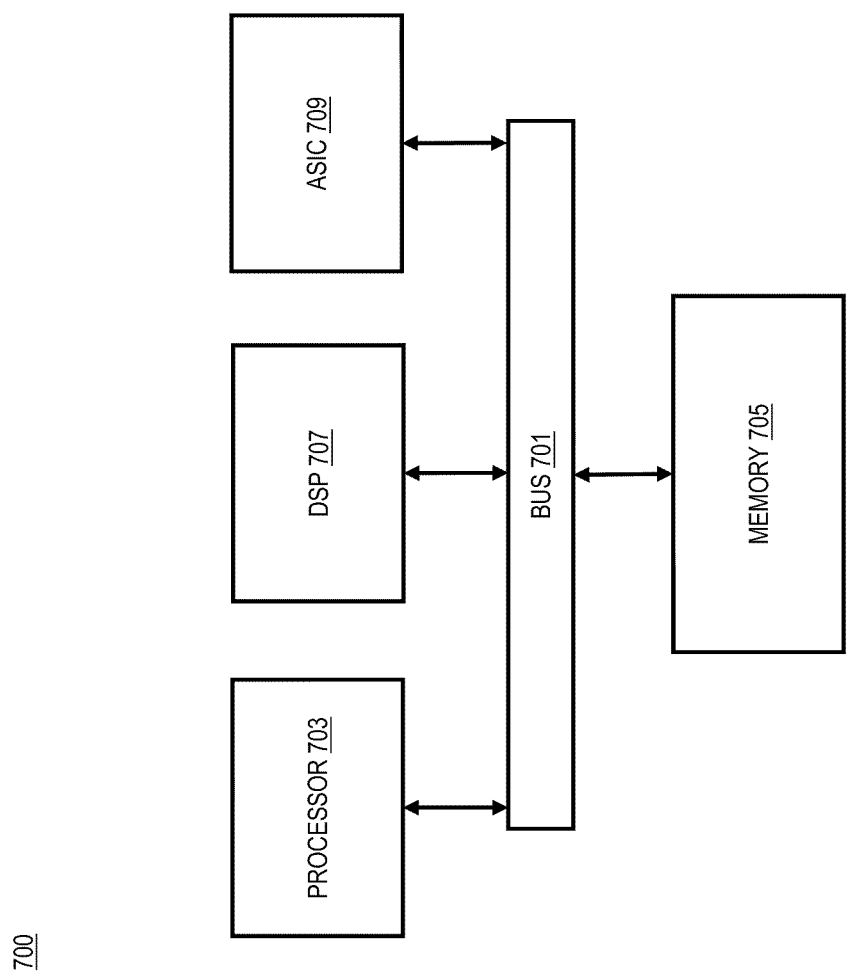
FIG. 7 is a diagram of a chip set that can be used to implement an embodiment of the invention.

FIG. 3 is a flowchart of a process for implementing a second authentication context, according to one embodiment. In one embodiment, the proxy module 113 performs the process 300 and is implemented in, for instance, a chip set including a processor and a memory as shown in FIG. 7.

In step 301, a request to initiate a service session is received. In one embodiment, the request is received from a client application (such as client application 111) of a user equipment (such as UE 103) to initiate a service session with an application server (such as one or more of application servers 107a-107n). In one example, the received request includes a first authentication context. As discussed before, in one embodiment, the first authentication context can include a token or a cookie. In step 303, verification of the first authentication context is requested. In one example, a verification request is transmitted to an authentication server (e.g., authentication server 105 of FIG. 1) to verify the first authentication context.

In step 305, a verification response is received. In one example, the verification response is received from, for example, the authentication server 105 of FIG. 1. According to an embodiment, the verification request sent to the authentication server 105 includes the first authentication context, which can include, for example, a token or a cookie. In this embodiment, the authentication server 105 can compare the received token with previously issued tokens and determine whether the first authentication context is valid or not. Additionally or alternatively, the verification request can include a cookie. The authentication server 105 determines whether the cookie is, for example, encrypted with a valid username and password, and generates the verification response based on the determination.

In step 307, a decision is made, at least in part, based on the verification, whether the first authentication context is valid. For example, if the authentication server 105 determines that the token specified by the first authentication context is a valid token, the cookie indicated by the first authentication context is encrypted with the valid username and password, etc. In certain embodiments, the verification response can include an indicator that the first authentication context is verified and is valid.

If it is determined that the first authentication context is valid, in step 309, a second authentication context is implemented, for example, with the client application 111 that requested the initiation of the service session. The second authentication context (e.g., a client-server authentication context established between the UE 103 and the proxy server 101) can include any authentication protocol such as password authentication protocols, secure remote password protocol, password authenticated key agreement protocol, etc. According to one embodiment (not shown), in step 309 a validity determination can be made based on the desired second authentication context. In one example, this determination can be based, at least in part, on information received with the request. In this example, the request that is received from the client application 111 and/or the UE 103 can include a preferred authentication scheme that is supported by the client application 111 and/or the UE 103 and by the proxy server 101. Therefore, the second authentication context (e.g., a client-server authentication context established between the UE 103 and the proxy server 101) can be implemented based on the preferred authentication scheme indicated by the client application 111 and/or the UE 103.

Figure 4B:
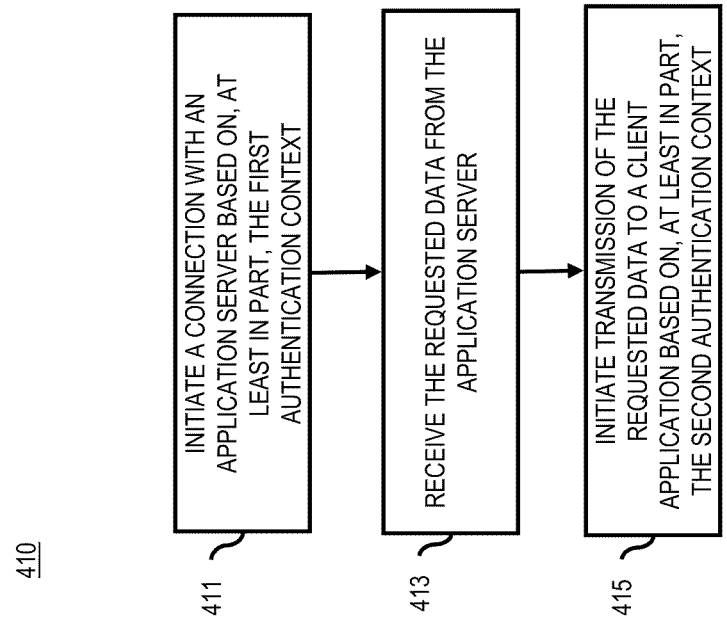
FIGS. 4A and 4B are flowcharts of processes for data retrieval based on first and second authentication contexts, according to various embodiments.
Figure 4A:
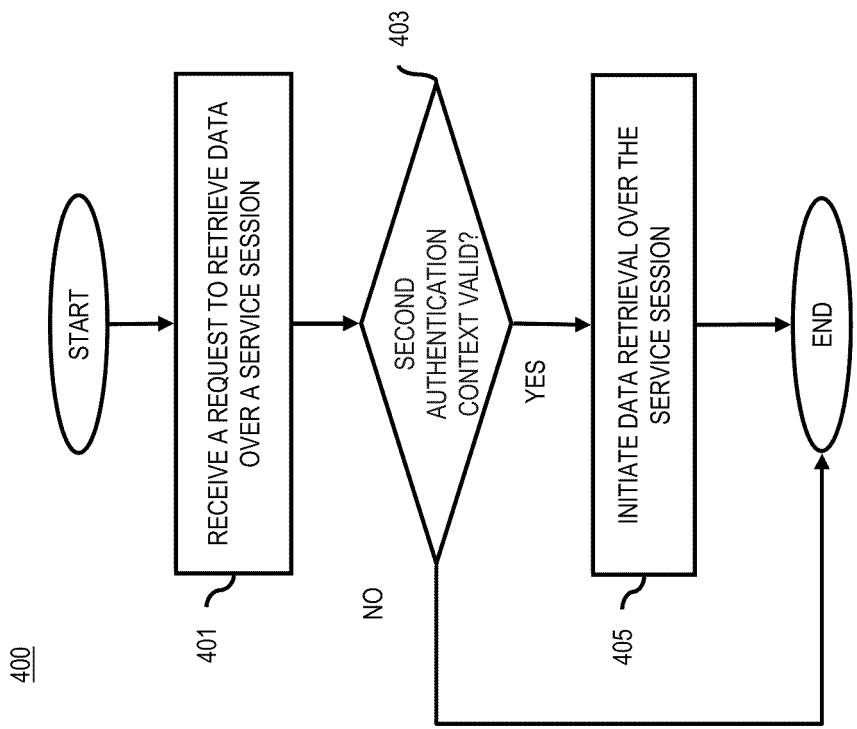

FIGS. 4A and 4B are flowcharts of processes for data retrieval based on first and second authentication contexts, according to various embodiments. In one embodiment, the proxy module 113 of the proxy server 101 performs the processes 400 and 410 and is implemented in, for instance, a chip set including a processor and a memory as shown in FIG. 7.

In step 401, a request to retrieve data over a service session is received. In one embodiment, the request is received from, for example, the client application 111 of FIG. 1 to access and retrieve data from, for example, application server 107a. In this embodiment, a service session has been implemented with the client application 111 using the second authentication context. By way of example, implement of the service session includes: (1) the client application 111 requesting initiation of the service session through the proxy module 113; (2) the proxy module 113 verifying the first authentication context; and (3) the proxy module 113 implementing the second authentication context (e.g., a client-server authentication context established between the UE 103 and the proxy module 113) based, at least in part, on the verification of the first authentication context.

In step 403, the proxy module 113 examines the second authentication context to determine its validity. In one example, the second authentication context (e.g., a client-server authentication context established between the UE 103 and the proxy module 113) can include information associated with the credentials of the client application 111 (and/or a user of the client application 111) according to the second authentication scheme (e.g., a client-server authentication scheme established between the UE 103 and the proxy module 113). In this example, the proxy module 113 can compare the information associated with the credentials of the client application 111 against the previously stored authentication information associated with the client application 111, which was, for instance, established during the implementation of the second authentication context (for example, at step 309 of FIG. 3). A determination of the validity of the second authentication context is, for example, based on this comparison.

If it is determined that the second authentication context is valid, in step 405, data retrieval over the service session is initiated. Step 405 is explained in more detail in FIG. 4B, according to one embodiment. In one example, the process 410 of FIG. 4B for retrieving data based on a server-server authentication context (first authentication context) can be implemented as step 405 of process 400 of FIG. 4A. When it is determined that the second authentication context received from, for example, the client application 111 is valid, in step 411, a connection is initiated with an application server (such as application server 107a). This connection is based, at least in part, on the first authentication context (e.g., a server-server authentication context implemented by the authentication server 105). In step 413, the requested data is retrieved from the application server 107, if the first authentication context (e.g., a server-server authentication context implemented by the authentication server 105) is valid. In step 415, the retrieved data is transmitted to, for example, the client application 111 that requested the data based, at least in part, on the second authentication context (e.g., a client-server authentication context established between the UE 103 and the proxy server 101). In one embodiment, the returned data can be a webpage, multimedia data (such as a video, a music file, an image), etc.

Figure 5:
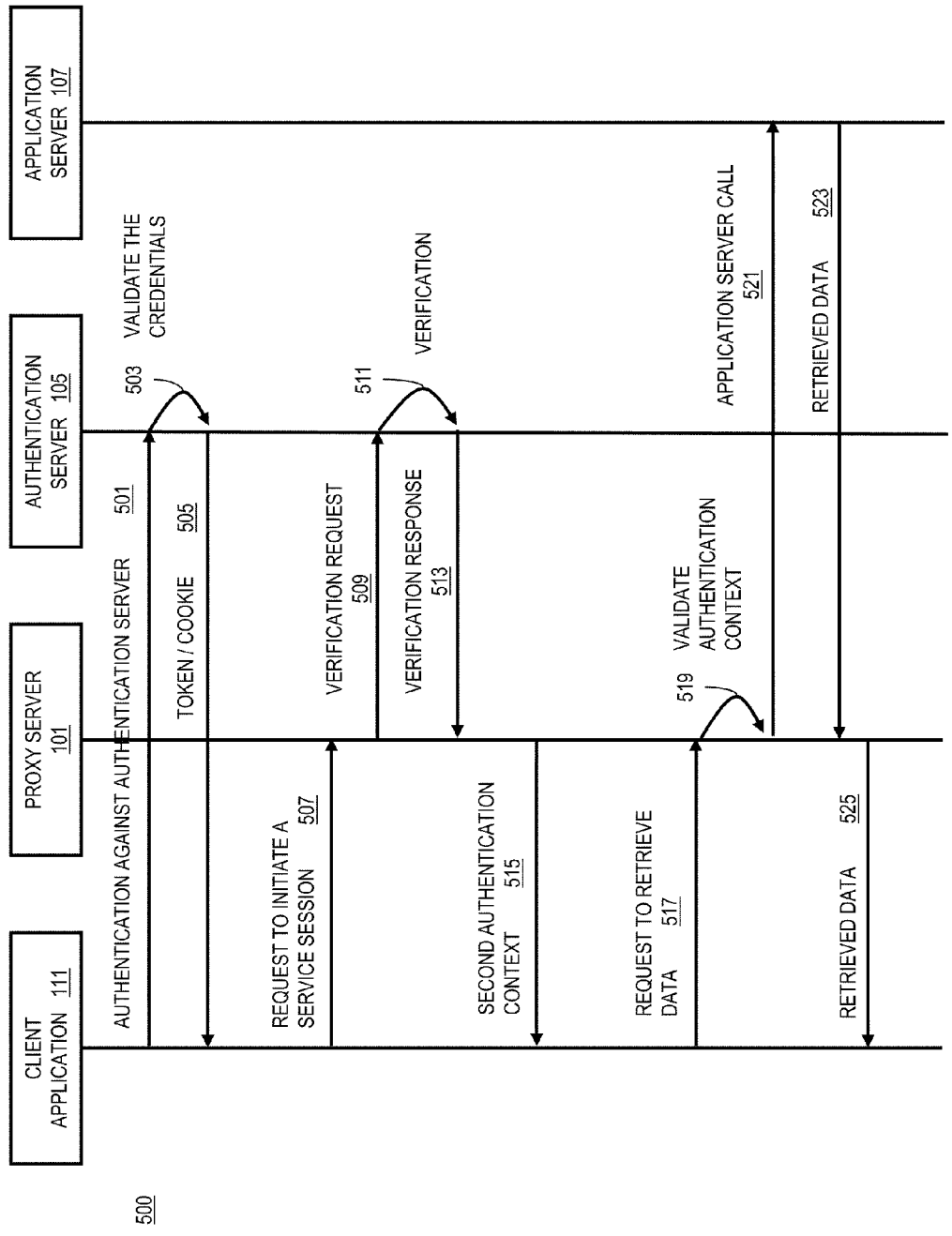
FIG. 5 is a time sequence diagram that illustrates a sequence of messages and processes for providing separation of authentication contexts for client-server and server-server communication, according to one embodiment.

FIG. 5 is a time sequence diagram that illustrates a sequence of messages and processes for providing separation of authentication contexts for client-server and server-server communication, according to one embodiment. A network process is represented by vertical line. A message passed from one process to another is represented by horizontal arrows. A step performed by a process is indicated by the text. The processes represented in FIG. 5 are the client application 111 (of the UE 103), the proxy server 101, the authentication server 105, and the application server 107. The example of FIG. 5 discusses the process 500 for providing separation of authentication contexts for client-server and server-server communication.

At 501, the client application 111 (of the UE 103) authenticates itself against the authentication server 105. In one embodiment, the message 501 passed from client application 111 to the authentication server 105 can include credentials of the client application 111, a user of the UE 103, etc. In one example, the credentials can include username, password, one time password, consumer key, secret key, biometrics, etc. The authentication server 105 validates the credentials received from the client application 111 (at 503) and generates/retrieves and transmits a first authentication context (such as a token or a cookie) to the client application 111 (at 505).

At 507, the client application 111 contacts the proxy server 101 with a request to initiate a service session. In one embodiment, if the authentication context of the client application 111 has not been verified/validated by the proxy server 101 (for example, the first authentication context that the client application 111 received before was expired and the client application 111 has received a new first authentication context), the service session initiation request 507 can include the first authentication context (such as the token and/or the cookie generated/retrieved by the authentication server 105).

Next, the proxy server 101 validates/verifies the received first authentication context. In one embodiment, the proxy server 101 generates and initiates transmission of a verification request to the authentication server 105 to verify the validity of the first authentication context (at 509). The authentication server 105 verifies the first authentication context (at 511) and communicates a verification response to the proxy server 101 (513). At 515, depending on the implementations or information received from the client application 111, the proxy server 101 determines a desired authentication protocol and implements a second authentication context with the client application 111. Therefore, according to one embodiment, communication between the client application 111 and the proxy server 101 can be based, at least in part, on the second authentication context.

According to one example, after the first authentication context of the client application 111 is verified and validated by the proxy server 101 and the second authentication context is implemented, the client application 111 contacts the proxy server 101 with a request to retrieve data (at 517). The request 517 can be based on the second authentication context that is implemented between the client application 111 and the proxy server 101 and can include information regarding the application server 107. At 519, the proxy server 101 can validate the second authentication context and if the authentication context is valid, the proxy server 101 can initiate a communication with the application server 107 (at 521).

According to one embodiment, the proxy server 101 can further control data retrieval request to the application server 107. For example, when the proxy server 101 receives the request 517 from the client application 111, the proxy server 101 can determine the application server 107, which the request 517 is intended for. Further, the proxy server 101 can determine the amount of data traffic for the application server 107. If the proxy server 101 determines that, for example, data traffic of the application server 107 is more than a predetermined threshold, the proxy server 101 can take actions, such as blocking the request 517, delaying the request for a later time (if it is permitted by a quality of service measure of the request 517), rerouting the request 517 to another application server, which has access to the requested data, etc. It is contemplated that any other criteria for determining load on the application server can also be implemented.

At 521, the proxy server 101 communicates with the application server 107 to request for the retrieval of data requested by the client application. In one embodiment, the communication 521 is based on the first authentication context. At 523, the application server 107 retrieves and transmits the requested data to the proxy server 101. At 525, the retrieved data is transmitted from the proxy server 101 to the client application 111.

The process 500 illustrates that the authentication context and/or authentication protocol used for client-server and sever-server communication is advantageously separated. For example, communication between the client application 111 and the proxy server 101 can be implemented based on a second authentication context and the communication between the proxy server 101 and the application server 107 can be implemented based on a first authentication context, as discussed before. Therefore, need for implementing same authentication scheme for both client-server and server-server communication can be eliminated.

Further, according to another embodiment, since the client application 111 can be authenticated against the proxy server 101 and a second authentication context can be implemented, further data retrieval requests from the client application 111 (as long as the second authentication context is valid) can be forwarded to the application server 107 and retrieved data can be sent to the client application 111 without the application server 107 contacting the authentication server 105 for each data request for verification of authentication contexts. Therefore, according to one embodiment, the load of processes on the application server 107 and/or the authentication server 105 is significantly reduced.

The processes described herein for providing separation of authentication protocols and/or authentication contexts of client-server and server-server communication may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
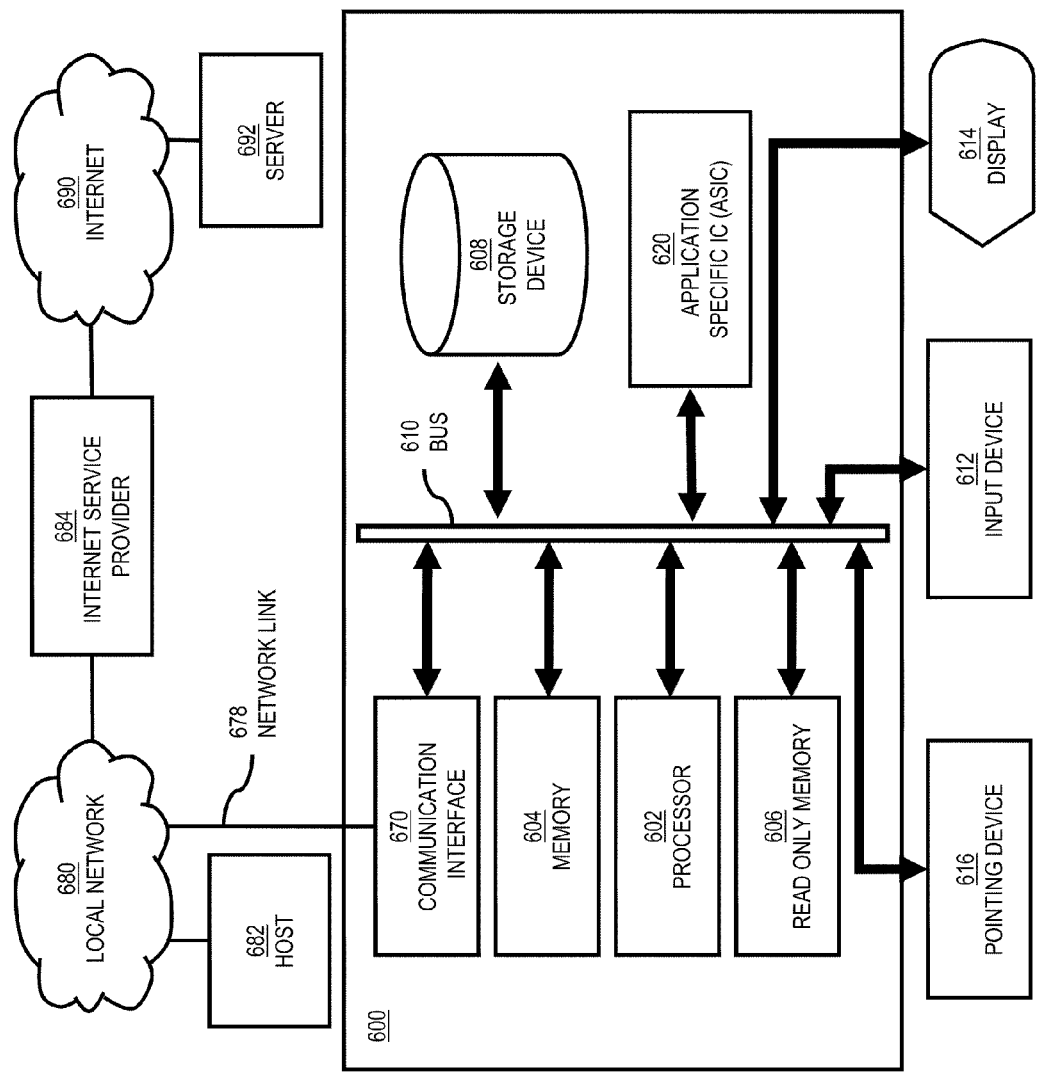
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide separation of authentication protocols and/or authentication contexts of client-server and server-server communication as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing separation of authentication protocols and/or authentication contexts of client-server and server-server communication.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to providing separation of authentication protocols and/or authentication contexts of client-server and server-server communication. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing separation of authentication protocols and/or authentication contexts of client-server and server-server communication. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing separation of authentication protocols and/or authentication contexts of client-server and server-server communication, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 109 for providing separation of authentication protocols and/or authentication contexts of client-server and server-server communication to the UE 103.

The term "computer-readable medium" as used herein to refer to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set 700 upon which an embodiment of the invention may be implemented. Chip set 700 is programmed to provide separation of authentication protocols and/or authentication contexts of client-server and server-server communication as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of providing separation of authentication protocols and/or authentication contexts of client-server and server-server communication.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide separation of authentication protocols and/or authentication contexts of client-server and server-server communication. The memory 705 also stores the data associated with or generated by the execution of the inventive steps.

Figure 8:
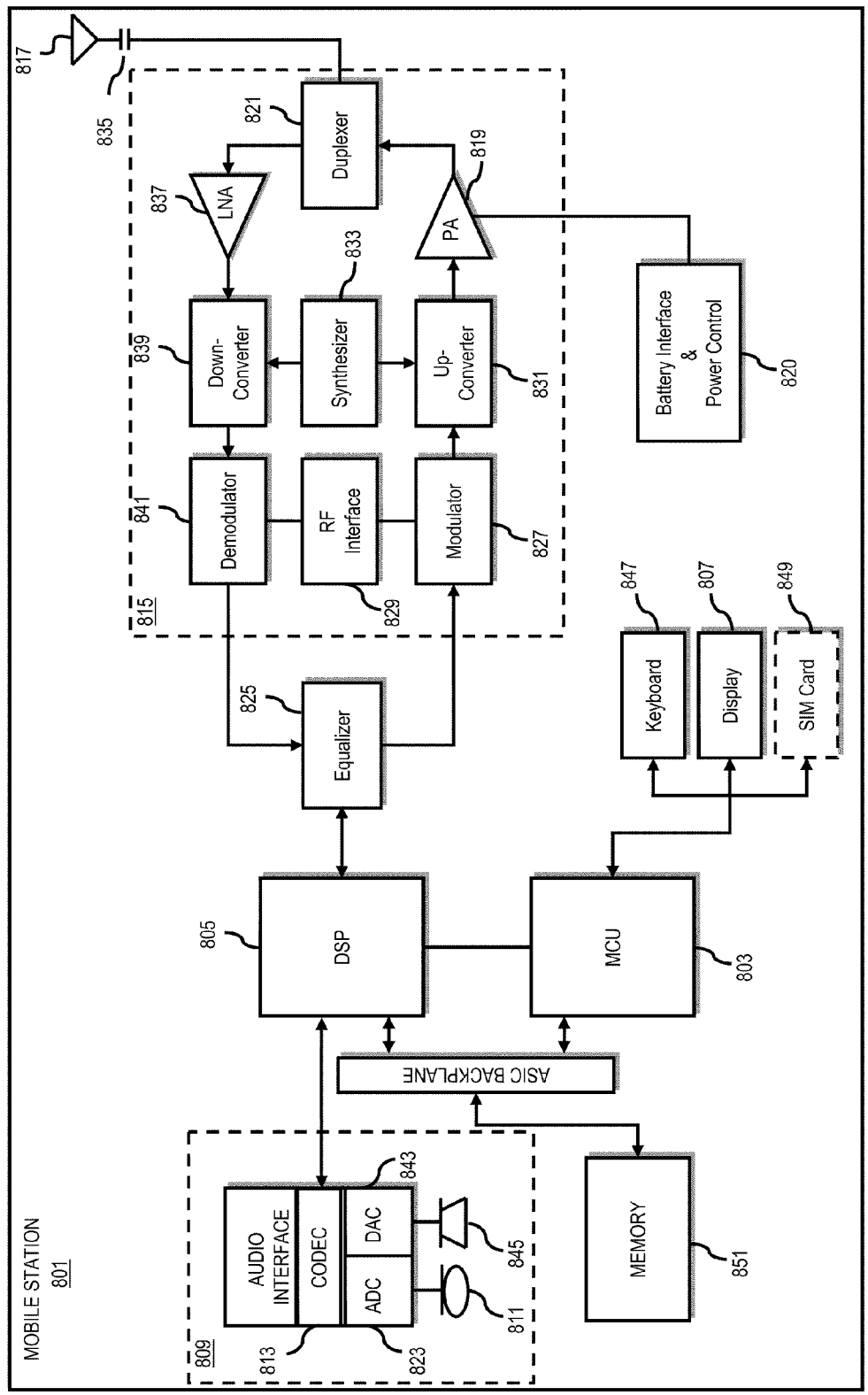
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps of providing separation of authentication protocols and/or authentication contexts of client-server and server-server communication. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing separation of authentication protocols and/or authentication contexts of client-server and server-server communication. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide separation of authentication protocols and/or authentication contexts of client-server and server-server communication. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving a request from a client to initiate a service session, wherein the request includes a first authentication context implemented by an authentication server directly with the client prior to receipt of the request;
requesting verification of the first authentication context from the authentication server;
validating the first authentication context based, at least in part, on the verification;
implementing a second authentication context based, at least in part, on the verification of the first authentication context to initiate the service session;
receiving another request from the client to retrieve data over the service session;
authenticating the another request from the client using the second authentication context; and
initiating retrieval of the data over the service session from another server using the first authentication context,
wherein one or more of the steps is carried out via a proxy server, and
wherein the second authentication context is based on one or more criteria that is/are different from the first authentication context.

2. A method of claim 1, wherein the first authentication context is based, at least in part, on a single sign-on authentication protocol applicable to a plurality of services.

3. A method of claim 1, wherein the data is retrieved over the service session using a trusted domain.

4. A method of claim 1, further comprising:
determining whether to implement the second authentication context; and
using the first authentication context in place of the second authentication context if the determination is to not implement the second authentication context.

5. A method of claim 1, wherein the first authentication context includes a limited use key, a secret key, a consumer key, an access token, or a combination thereof.

6. A method of claim 1, wherein the one or more criteria that is/are different from the first authentication context include one or more of capabilities of user equipment, capabilities of a client application, and network load.

7. An apparatus comprising:
at least one processor; and
at least one memory including computer program code,
the at least one memory and the computer program code configured to, with the at least one processor, cause the apparatus to perform at least the following,
receive a request from a client to initiate a service session, wherein the request includes a first authentication context implemented by an authentication server directly with the client prior to receiving the request;
request verification of the first authentication context from the authentication server;
validate the first authentication context based, at least in part, on the verification;
implement a second authentication context based, at least in part, on the verification of the first authentication context to initiate the service session;
receive another request to retrieve data over the service session;
authenticate the another request using the second authentication context; and
initiate retrieval of the data over the service session using the first authentication context,
wherein one or more of the actions is carried out via a proxy server, and
wherein the second authentication context is based on one or more criteria that is/are different from the first authentication context.

8. An apparatus of claim 7, wherein the first authentication context is based, at least in part, on a single sign-on authentication protocol applicable to a plurality of services.

9. An apparatus of claim 7, wherein the data is retrieved over the service session using a trusted domain.

10. An apparatus of claim 7, wherein the apparatus is further caused to:
determine whether to implement the second authentication context; and
use the first authentication context in place of the second authentication context if the determination is to not implement the second authentication context.

11. An apparatus of claim 7, wherein the first authentication context includes a limited use key, a secret key, a consumer key, an access token, or a combination thereof.

12. An apparatus of claim 7, wherein the one or more criteria that is/are different from the first authentication context include one or more of capabilities of user equipment, capabilities of a client application, and network load.

13. A computer-readable storage medium carrying one or more sequences of one or more instructions which, when executed by one or more processors, cause an apparatus to at least perform the following steps:
receiving a request from a client to initiate a service session, wherein the request includes a first authentication context implemented by an authentication server directly with the client prior to receiving the request;
requesting verification of the first authentication context from the authentication server;
validating the first authentication context based, at least in part, on the verification;
implementing a second authentication context based, at least in part, on the verification of the first authentication context to initiate the service session;
receiving another request to retrieve data over the service session;
authenticating the another request using the second authentication context; and
initiating retrieval of the data over the service session using the first authentication context,
wherein one or more of the steps is carried out via a proxy server, and
wherein the second authentication context is based on one or more criteria that is/are different from the first authentication context.

14. A computer readable storage medium of claim 13, wherein the first authentication context is based, at least in part, on a single sign-on authentication protocol applicable to a plurality of services.

15. A computer readable storage medium of claim 13, wherein the data is retrieved over the service session using a trusted domain.

16. A computer readable storage medium of claim 13, wherein the apparatus is caused to further perform:
- determining whether to implement the second authentication context; and
- using the first authentication context in place of the second authentication context if the determination is to not implement the second authentication context.

17. A computer readable storage medium of claim 13, wherein the one or more criteria that is/are different from the first authentication context include one or more of capabilities of user equipment, capabilities of a client application, and network load.

* * * * *